US006996315B2

(12) United States Patent
Henze et al.

(10) Patent No.: US 6,996,315 B2
(45) Date of Patent: Feb. 7, 2006

(54) PROCESS FOR PRODUCING A LEACHED FIBER BUNDLE, AND IMPROVED LEACHED FIBER BUNDLE

(75) Inventors: Inka Henze, Udenheim (DE); Michael Weisser, Sturbridge, MA (US); Brigitte Sommer, Mainz (DE); Andrea Suchi, Alzey (DE); Ute Busch, Albig (DE); Tamara Sweeck, Bad Münster (DE); Richard Strack, Sturbridge, MA (US)

(73) Assignee: Schott AG, Mainz (DE)

( * ) Notice: Subject to any disclaimer, the term of this patent is extended or adjusted under 35 U.S.C. 154(b) by 173 days.

(21) Appl. No.: 10/654,237

(22) Filed: Sep. 3, 2003

(65) Prior Publication Data

US 2004/0126071 A1 Jul. 1, 2004

(30) Foreign Application Priority Data

Sep. 3, 2002 (DE) ................................ 102 40 508

(51) Int. Cl.
*G02B 6/04* (2006.01)

(52) U.S. Cl. ....................... 385/115; 385/116; 385/117; 65/429; 65/472

(58) Field of Classification Search ................. 385/115
See application file for complete search history.

(56) References Cited

U.S. PATENT DOCUMENTS

| | | | | |
|---|---|---|---|---|
| 3,624,816 | A * | 11/1971 | Strack et al. | 385/115 |
| 3,653,739 | A * | 4/1972 | Strack | 385/115 |
| 3,669,772 | A * | 6/1972 | Strack | 216/24 |
| 3,674,452 | A * | 7/1972 | Strack | 65/410 |
| 4,080,045 | A | 3/1978 | Nakatsubo et al. | |
| 4,389,089 | A | 6/1983 | Strack | |
| 6,243,520 | B1 * | 6/2001 | Goldman | 385/115 |

FOREIGN PATENT DOCUMENTS

| | | |
|---|---|---|
| JP | 59222802 | 12/1984 |
| JP | 60121402 | 6/1985 |
| JP | 60131505 | 7/1985 |

* cited by examiner

*Primary Examiner*—Sung Pak
(74) *Attorney, Agent, or Firm*—Volpe and Koenig, P.C.

(57) ABSTRACT

A leached fiber bundle with the light outlet points positioned as accurately as possible is provided, in which the end faces are not completely fused together, but rather are only fused together at their contact surfaces. The interstices formed are permanently filled with adhesives with the aid of a pressure reduction. To protect the optical fibers from mechanical load, adhesives are introduced into the transition region between the fixed end region and a flexible region. This allows the leached fiber bundles to be produced more economically and also improves their service life.

19 Claims, 3 Drawing Sheets

PROCESS FOR PRODUCING A LEACHED FIBER BUNDLE, AND IMPROVED LEACHED FIBER BUNDLE

CROSS-REFERENCE TO RELATED APPLICATIONS

This application claims priority from German Application No. 102 40 508.5-45, filed Sep. 3, 2002, which is incorporated herein by reference as if fully set forth.

BACKGROUND

The invention relates to a process for producing leached fiber bundles (LFBs), and to an improved LFB.

LFBs are used in particular as image light guides for the transmission of optical information, for example in endoscopes. LFBs generally include a multiplicity of optical fibers which are arranged in defined fashion. The diameter of the optical fibers is typically 8 to 120 $\mu$m. The optical fibers themselves often comprise a light-conducting core and a sheath, for example a glass or plastic, with a lower refractive index.

Processes for producing LFBs are known, for example from WO 02/40416 A1 and U.S. Pat. No. 4,389,089. To obtain an ordered fiber arrangement, LFBs are produced by drawing out correspondingly arranged fiber bundle preforms, for example glass rods or tubes, which additionally include at least a few spacers made from etching glass, i.e. a glass which can be partially dissolved by treatment with acids, bases or deionized water. The spacer preforms are generally in the form of tubes or rods. The distance between and arrangement of the optical fibers with respect to one another can be defined by a suitable arrangement of the etchable spacers.

The fiber bundle preforms obtained in this way are then drawn out under the action of heat using known processes until the desired fiber or fiber bundle cross section is reached. In the process, the spacers are fused to the optical fibers and fill the space between the individual optical fibers.

To produce an image light guide, the ends of the fused fiber bundles are provided with a protective layer which is resistant to acids and/or lyes, and the spacers located in the unprotected regions are removed in hot acid or lye baths or baths in deionized water. In this way, the optical fibers are uncovered or separated from the spacers again and the fiber bundle becomes flexible at these locations. The ends remain connected to one another and therefore rigid and fixed. The end faces are also usually polished in order to increase the optical quality.

In many applications, for the optical quality it is also important for the light outlet points, i.e. the end faces of the optical waveguides to adopt an accurately defined position in the matrix of the end faces of optical fibers and spacers.

The production process described has the drawback that, on account of the optical fibers and the etching glass fusing together in the end region of the fiber bundle, the fibers are shifted out of their original geometric position, and consequently an accurate position of the light outlet points at the end of the optical fiber bundle is lost. For applications which require a high image or light transmission quality, for example connecting units for optical data transmission (optical interconnects), therefore, it is not possible to use this process for producing optical fiber bundles.

A general problem with optical fiber bundles is the fact that their ability to withstand mechanical loads is often low. If fiber bundles are bent, the individual fibers rub against one another, which leads to an increased mechanical stress which can ultimately cause fibers to break. If dirt particles are present between the individual fibers, the stresses are increased further. Each broken optical fiber leads to the associated light point failing, so that if a corresponding number of fibers have broken, the entire fiber bundle has to be exchanged. To extend the service life of the optical fiber bundle, WO 02/40416 A1 proposes introducing a special powder between the individual fibers of the bundle and placing a protective mesh around the flexible region of the optical fiber bundle. However, even these measures are for certain applications not sufficient to effect sufficient durability of the fiber bundles.

SUMMARY

The invention is based on the object of providing a process for producing a leached fiber bundle with the position of the light outlet points defined as accurately as possible, and a leached fiber bundle which has the light outlet points in a position which is as accurately defined as possible.

The object is achieved by the process according to the invention for producing leached fiber bundles and by the leached fiber bundle in accordance with the independent claims. Preferred embodiments will emerge from the subclaims.

The desired position of the optical fibers results, as described in the introduction, from the arrangement of the fiber preforms and the spacer preforms before they are drawn out to form fibers. The drawing process merely influences the absolute size of the fiber diameters and therefore the absolute spatial position of the light outlet points, but does not influence the relative position of these points with respect to one another. To ensure that this relative position is not shifted by the conventional fusing of the end region or regions, according to the process according to the invention the arranged fiber preforms together with the spacer preforms made from etching glass are drawn out in such a way that the individual fibers and spacers, at least at one end, are not completely fused together, but rather are fused together only at their contact surfaces. In this way, spaces are formed between the individual fibers and the spacers, referred to below as "interstices".

The distance between the light outlet points, referred to below as the "pitch" is determined by the diameter of the spacers. The size of the interstices is in turn dependent on the ratio of the optical fiber diameter to the spacer diameter. In general, the diameters of the optical fibers and of the spacers are matched to one another in such a way that the interstices have the minimum possible size.

Before the next process steps, namely the polishing of the end face and removal of the drawn-out spacers in the region of the fiber bundle which is to be flexibilized, the interstices have to be filled. Without the interstices being filled, it would be impossible to obtain an end region of high optical quality, since during removal of the spacers the baths used (e.g. acid or lye baths or baths in deionized water) would penetrate into the interstices and would also dissolve or at least attack the spacers in the end region, so that it would once again be impossible to obtain an accurate position of the light outlet points. Furthermore, during the polishing of the end faces, abraded material would pass through the interstices into the region of the fiber bundle which is subsequently to become flexible or has already been flexibilized, where this material, on account of friction, would lead to an increased mechanical load on the optical fibers and therefore to a reduced service life on the part of the fiber bundle.

Surprisingly, it has been found that the required filling of the interstices can be effected in a simple way using adhesives. Certain demands, which will be explained below, are to be placed on the adhesives. Examples of adhesives which are to be used are cited in the exemplary embodiments. If the adhesives do not cure of their own accord in the interstices, it is possible to take suitable curing measures after the adhesives have been introduced into the interstices. Depending on the particular adhesive, these measures may, for example, comprise thermal curing, curing with the aid of gaseous catalysts or irradiation with UV or visible light. Combinations of curing methods are also possible.

After the interstices have been filled and the adhesives have been at least partially cured, the at least one unfused end of the fiber bundle is provided with a protective layer, for example an acid-resistant or lye-resistant wax, and the spacers are removed in an etching bath or by means of other suitable measures. The protective layer at the end region(s) prevents the means used to remove the spacers from advancing into the end regions and then attacking the spacers.

The region of the fiber bundle in which the spacers have been removed, generally the central region, is flexible, while the end region or regions remain rigid. The adhesives can be introduced into the interstices in various ways. One possible option in this respect is, for example, the adhesives being introduced with the aid of capillary forces in the interstices. For this purpose, the end region of the fiber bundle is generally immersed in the adhesive, whereupon the adhesive is sucked into the interstices up to a certain height as a result of the capillary forces. However, a problem in this respect is that relatively great filling heights are difficult to achieve and that the capillary forces can only be exploited when filling a single end of the fiber bundle, since the counterpressure of the gas volumes located in the interstices makes it more difficult to fill the second end of the fiber bundle.

The invention is based on the idea that the introduction of the adhesives into the interstices can be effected with the aid of a pressure difference between the atmosphere outside the fiber bundle and the gas volumes located in the interstices; a pressure reduction should be present in the interstices. The pressure reduction can be generated by a vacuum pump. This method is extremely simple to employ if it is only intended to fill the interstices at one end of the fiber bundle. Then, the end which is to be filled can be immersed in the adhesives, while a pressure reduction can be applied to the other end. In this way, adhesive is sucked into the interstices from the immersed end. If the other end of the fiber bundle is also to be filled with adhesive, it is necessary to take measures to allow the pressure reduction also to be applied in the region which is subsequently to be flexibilized, generally the central region, of the fiber bundle.

Another possible way of generating the pressure reduction and of introducing the adhesives is heating and then cooling the gas volumes in the interstices. If the gas volumes located in the interstices are first all heated, for example by heating the fiber bundle or regions thereof, the heated gas volumes expand. If the end or ends of the fiber bundle are immersed in the adhesives in good time, the gas volumes suck the adhesives into the interstices as they contract through cooling. In this way, it is also possible for both ends of the fiber bundle to be filled in an extremely simple way.

The use of a pressure reduction generally has the advantage that in this way it is possible to accurately set the filling height of adhesives in the interstices. Furthermore, it is possible to achieve higher filling heights than with the methods based on capillary forces. Furthermore, it is possible to use adhesives from a higher viscosity range. Of course, it is in general terms possible to use combinations of a plurality of adhesives instead of a single adhesive.

It is preferable for the interstices in two rigid end regions of an LFB to be filled with at least one adhesive to a filling height of at least 0.5 cm with the aid of a pressure reduction. In a further preferred embodiment, the interstices are filled with at least one adhesive to a filling height of 0.5 cm to 5 cm, particularly preferably of 1.5 cm to 2.5 cm. The filling height is in each case measured from the end face of the end region towards the flexible region. In a most preferred embodiment the interstices in two rigid end regions are completely filled with at least one adhesive. This comprises the filling height of the adhesives amounting to the same height as the height of the rigid end regions or the filling height even exceeding the height of the rigid end regions.

After the interstices have been filled, it may be necessary to cure the adhesives, if this does not occur automatically. For this purpose, it is preferable to use thermal methods or methods which are based on irradiation with light. Combinations of the two options are also conceivable. It is particularly preferable to use adhesives which can be cured with the aid of UV irradiation. The UV light can be radiated into the optical fibers and spacers and thereby promotes the curing of the adhesives.

Certain properties must be borne in mind when selecting the adhesives to fill the interstices. Firstly, in the uncured state their flow properties must be sufficient to enable them to penetrate into the interstices. Therefore, it is preferable to use adhesives with a viscosity of $5\cdot10^{-2}$ Pa·s to 5 Pa·s at 25° C. Furthermore, the adhesives must have the following properties: their volumetric contraction during curing must not be too great, they must have a low coefficient of thermal expansion (preferably <100 ppm/K), good durability under climatic tests and long-term heating to 120° C., no release of components in gas form during the removal of the spacers and heating to 150° C. for a period of 5 minutes, a high ability to withstand hot acids, lyes and/or deionized water, in particular the agents which are used to remove the spacers, and good bonding to glass. Furthermore, preferred adhesives have the minimum possible polishability, i.e. when the end surfaces are being polished they are not abraded to any significantly greater extent than the glass material, so that no pits are formed in the filled interstices between optical fibers and spacers which run to a depth of deeper than 3 $\mu$m for a interstice size of 45 $\mu$m. The interstice size is to be understood as meaning the height of the substantially triangular shape formed by the interstice. In this way, it is possible to obtain a high-quality, i.e. substantially planar surface. It has been found that adhesives which are based on epoxy satisfy the above properties. In particular adhesives which contain nanoparticles have revealed only a slight tendency to be polished out.

After the spacers have been removed, the fiber bundle is generally present in the form of a fiber bundle with a flexible central region and rigid, fixed end regions. The spacers are retained in the end regions but removed in the flexible region. This means that in the flexible region substantially only the optical fibers remain, at defined distances from one another. Unlike with individual fibers, which are likewise used for data transmission, the optical fibers which remain in the flexible region of the fiber bundles do not have any significant protection from additional sheaths, for example thick plastic sheaths. The individual fibers in the flexible middle region may, as described in WO 02/40416 A1, be protected from mechanical loads. However, it has been found that in particular the transition regions between fixed end regions and flexible middle region are particularly sensitive to mechanical loads which can be caused, for example, by the considerable distance between the fibers and therefore the considerable angle of inclination of the individual fibers. This leads to high levels of fiber fractures. Therefore, in a preferred embodiment, the transition regions are provided with additional protection. This is achieved in a surprisingly simple way through adhesives being introduced at least partially between the exposed optical fibers in the transition regions. Different demands may be imposed on these adhesives from the demands imposed on the adhesives used to fill the interstices, since they do not have to withstand the removal of the spacers and a machining treatment. Instead, their purpose is to reduce the mechanical load on the optical fibers in the transition region.

It has been found that optimum results are obtained with adhesives which in the cured state still surround the optical fibers with sufficient flexibility for the pressure involved in a bending load on the transition regions to be absorbed by the optical fibers by deformation of the adhesives and if appropriate dissipated to the rigid end regions, but without being so soft that they are cut into by the optical fibers. For the adhesives of the transition regions, it is also important for no stresses induced by the adhesives to be transmitted to the individual fibers. What this means is that the softer the adhesives, the more feasible it is for a high level of shrinkage or high coefficient of thermal expansion of the adhesives to be directly absorbed therein, so that the loads which are thereby generated are not transmitted to the fibers. Fibers which are exposed to a high level of stress continue to have high attenuation rates during transmission of light. In general, it is preferred to use adhesives which have low levels of thermal expansion, high elongations at break, a good durability in climatic tests and during long-term heating to 120° C., as well as good adhesion to glass. The protection for the transition regions can be used not only for LFBs with filled interstices but also for conventional LFBs with fused end regions.

It has been found that adhesives which are based on silicone or acrylate fulfill the above requirements. In the case of the adhesives based on acrylate, it is particularly preferable to use adhesives which contain copolymers, e.g. polyurethane. The introduction of the adhesives into the transition region or regions can preferably be effected by injection, either manually or automatically with the aid of syringes with thin needles.

As a further step, the rigid end or ends of the fiber bundle can be provided with sleeves which may be formed, for example, of metal, glass, plastic, ceramic or composites. The sleeves on the one hand protect the rigid ends of the fiber bundle, and on the other hand make it possible to produce the connection to other optical or optoelectronic components.

To minimize the working steps required to be carried out on the drawn-out fiber bundle which is not protected with adhesives, it is possible for the abovementioned sleeve to be fitted to the end or ends of the fiber bundle before the spacers are removed or even before the interstices are filled.

The invention also relates to the provision of a leached fiber bundle which has the image outlet points positioned as accurately as possible. Its end regions are not completely fused, but rather have interstices. A fiber bundle according to the invention has at least two rigid end regions with interstices which are filled with at least one adhesive up to a filling height of at least 0.5 cm, preferably of 0.5 cm to 5 cm, particularly preferably of 1.5 cm to 2.5 cm. In a most preferred embodiment the interstices are completely filled with at least one adhesive.

A further leached fiber bundle according to the invention has at least one rigid end region with interstices which are filled with at least one adhesive whose viscosity in the uncured state is $5 \cdot 10^{-2}$ Pa·s to 5 Pa·s at a temperature of 25° C.

In a preferred embodiment of the leached fiber bundle, the adhesives which have been introduced into the interstices are able to withstand hot etching acids and/or hot etching lyes and/or deionized water. Furthermore, the filled adhesives preferably have the lowest possible polishability.

In a preferred embodiment, the fiber bundle has at least one transition region between at least one rigid end region and the flexible regions, and this transition region is protected with at least one adhesive.

The distribution and selection of the adhesives used to protect the transition regions have likewise been described above. On account of the protected transition regions, the fiber bundle according to the invention proves to be surprisingly resistant to mechanical loads.

In a particularly preferred embodiment, the fiber bundle according to the invention is provided with a sleeve at at least one end. The sleeve may be formed of metal, glass, plastic, ceramic or composite.

The fiber bundle according to the invention can be used as an image light guide for the transmission of image information. In this case, it is of course possible for only part of the overall image which is to be represented to be transmitted, given a corresponding arrangement of the optical fiber bundles.

The fiber bundle according to the invention is preferably used in endoscopy.

It is also possible for the fiber bundle according to the invention to be used for optical data transmission. This application is to be understood as encompassing, for example, digital and analogue optical data transmission. The fiber bundle according to the invention is particularly preferably used as an optical interconnect, i.e. as an optical element which transmits and/or converts, in a targeted manner, data, image or general light information between optical functional units.

BRIEF DESCRIPTION OF THE DRAWINGS

The invention is explained in more detail below on the basis of the drawings and exemplary embodiments.

DETAILED DESCRIPTION OF THE PREFERRED EMBODIMENTS

Figure 1:
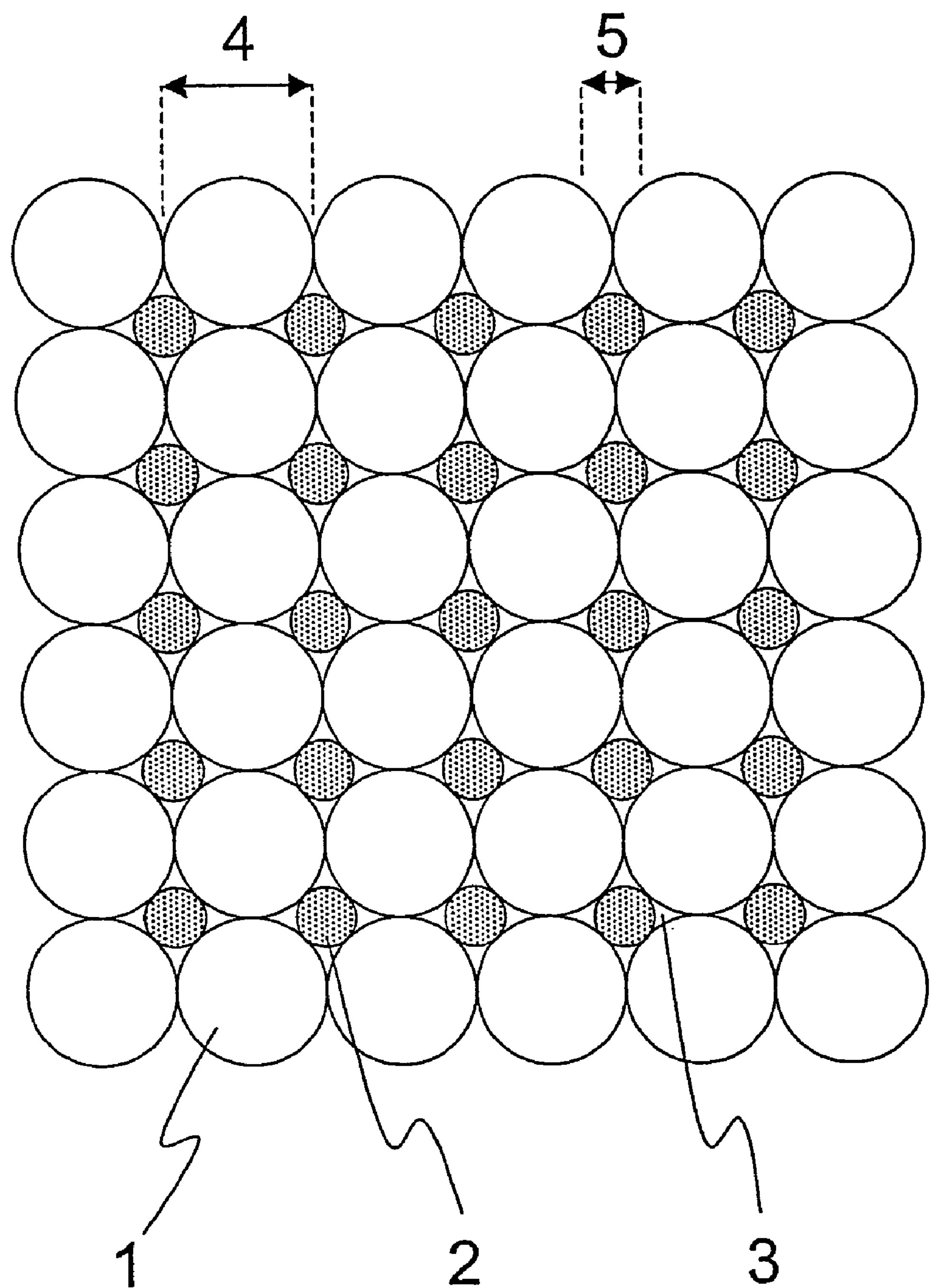
FIG. 1 is an enlarged cross-sectional view through an end region of a drawn out and leached fiber bundle.

FIG. 1 shows a plan view of an end region of a drawn out leached fiber bundle. The optical fibers 2 and spacers 1 are not completely fused together, so that interstices 3 are located between them. The figure does not illustrate the fact that the optical fibers 2 usually comprise a light-conducting core and a sheath. The interstices 3 are subsequently filled with at least one adhesive.

The pitch 4 between the optical fiber ends 2 is determined by the diameter of the spacers 1, if the diameter 5 of the optical fibers 2 is less than or equal to the smallest interstice diameter. If the diameter 5 is smaller than the smallest interstice diameter, it can be adapted by a spacer tube around the optical fibers 2.

Figure 2:
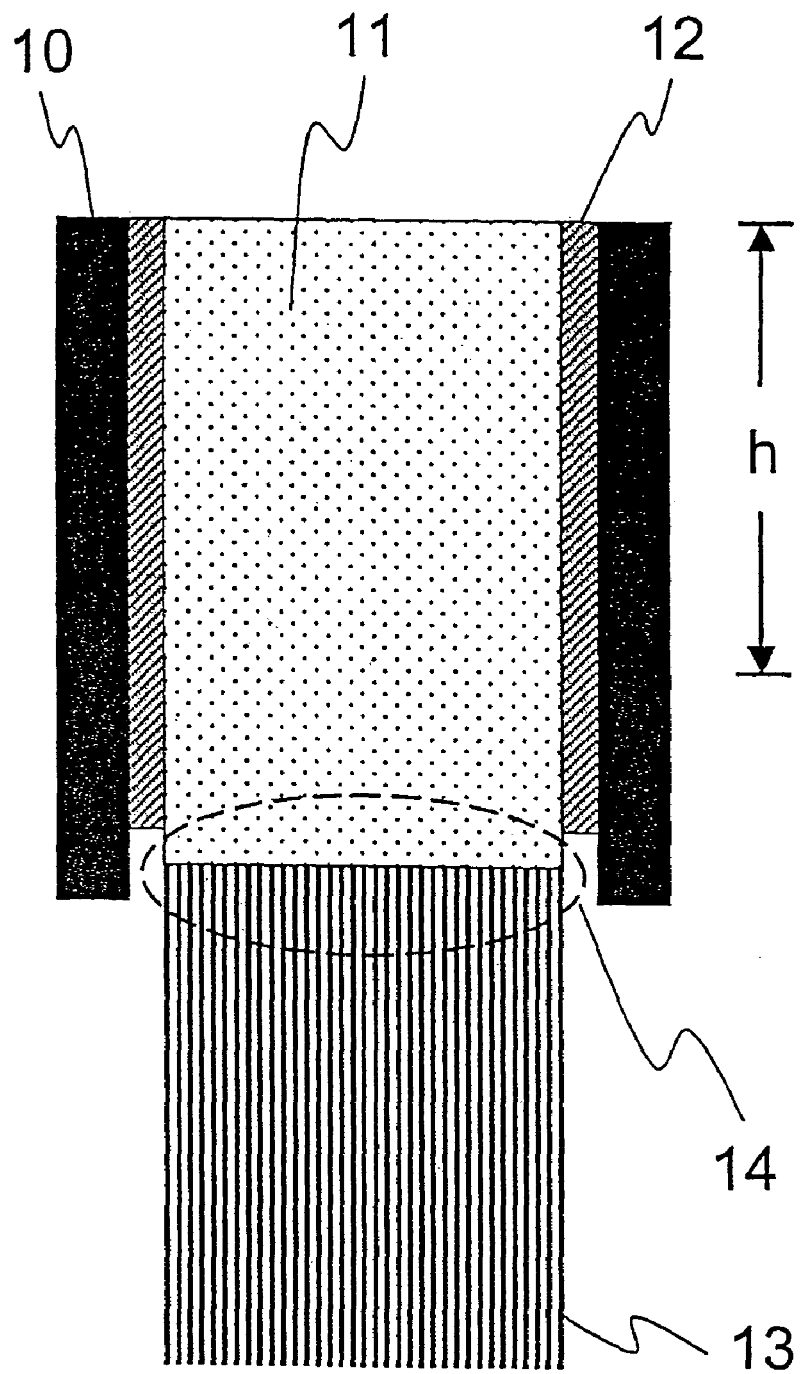
FIG. 2 is a longitudinal section view through the end region of the fiber bundle.

FIG. 2 shows the longitudinal section through the end region of a drawn-out optical fiber bundle with end faces which are not completely fused. The rigid end region 11 is provided with a sleeve 10 made, for example, from metal, glass, plastic, ceramic or composite. In the rigid end region 11 there are optical fibers and spacers, and the interstices are filled with adhesive. An interlayer 12, which protects the sensitive end region from damage caused be mechanical loads and/or forms a positively locking connection between end region 11 and sleeve 10, may be introduced between sleeve 10 and end region 11. This interlayer 12 may, for example, be formed of a wax.

The rigid end region 11 is filled with at least one adhesive up to a filling height (h). Of course, it is possible for the end region to be completely filled.

The filling height (h) is measured from the end face of the rigid end region 11 towards the flexible region 13.

The end region 11 is adjoined by the transition region 14 between rigid end region 11 and flexible region 13. According to the invention, at the transition region the adhesive or adhesives for protection of the transition region are introduced.

Figure 3:
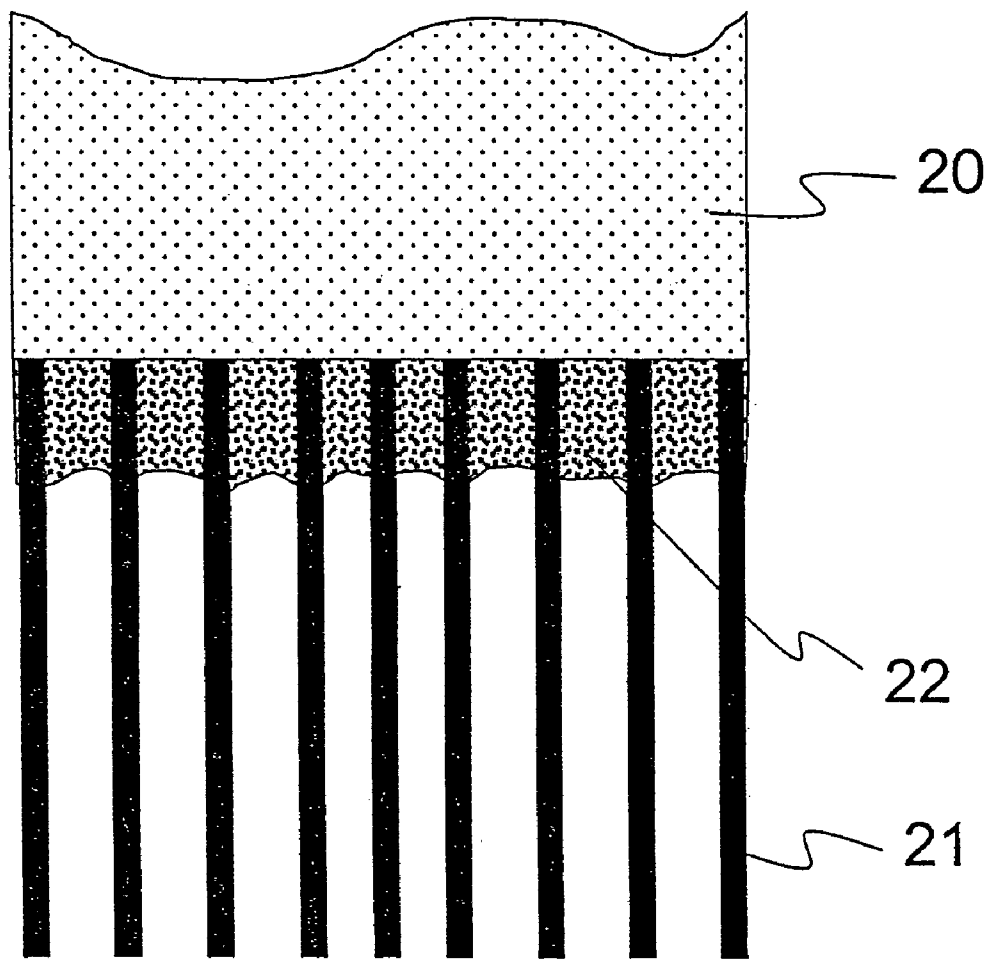
FIG. 3 is an enlarged view of a portion of FIG. 2.

FIG. 3 shows the transition region 14 from FIG. 2 on a larger scale. In this region, the flexible optical fibers 21 meet the rigid region 20, not all of which is shown. The rigid region 20 includes both optical fibers and spacers. Adhesive 22 which protects the transition region from mechanical loads has been introduced into the spaces between the optical fibers 21.

In the following exemplary embodiments, optical fiber bundles with a pitch of 250 μm were produced using the process according to the invention.

In tests, adhesives from the VITRALIT® series produced by Panacol-Elosol have proven particularly suitable for filling the interstices, in this case in particular VITRALIT® 1508 containing 15% of nanoparticles and VITRALIT® 1605 (viscosity: 0.3-0.75 Pa·s at 25° C.). The adhesives from the ARALDITE® series from Ciba Specialty Chemicals can also advantageously be used, in this case in particular AY 103 and HY 956 (viscosity: 3 Pa·s at 25° C.). VITRALIT® is based on one component epoxy, and ARALDITE® is based on two component epoxy.

The abovementioned adhesives were used to produce fiber bundles according to the invention using the process of the invention. All the adhesives mentioned had only a very low polishability and also had a very good resistance to the production process described above. In particular during the application of a wax layer 12 at 150° C. to protect the end region 11 from the removal of the spacers and the subsequent etching for removal of the spacers using hot acids, lyes and deionized water, no changes occurred to the mechanical strength of the adhesives, and also no gaseous components were released.

At the pitch 4 of 250 μm used and an optical fiber diameter 5 of 100 μm, the interstices 3 were filled by first of all applying a pressure reduction, generated by a vacuum pump, to one end of the fiber bundle and filling the other end with adhesive to a filling height (h) of 2 cm. Then, the drawn-out, still rigid fiber bundle was heated with the aid of a hot-air drier (setting: 450° C. for 60 s), and the as yet unfilled end was immersed in the adhesive and then cooled. The contracting gas volumes in the interstices 3 ensured that the adhesive was drawn into the rigid fiber bundle ends to a filling height (h) of 2 cm.

It is also possible, instead of filling the interstices of the first end region with the aid of a vacuum pump, for the first end region also to be filled with adhesives by exploiting the contraction of preheated gas volumes, if the other end is at least temporarily closed, for example using a Teflon film, before the end region is immersed in the adhesives.

Of course, it is also possible for the interstices of one rigid end of the fiber bundle first of all to be filled with adhesives using the capillary forces. In this case, however, the introduction of the adhesives into the other end has to be effected with the aid of a pressure reduction as described.

The fiber bundle ends which had previously been filled with adhesive were then provided with end sleeves made from metal, polished, the end regions were protected with wax and the spacers were removed as described, so that the middle region was flexibilized. In bending tests with a bending radius of 25 mm, 24,000 bends and a lower end load weighing 20 g, it was found that even with the pitch 4 of 250 μm and an optical fiber diameter 5 of 100 μm, more than half of all the optical fibers 21 broke in the transition region 14. This means a high scrap rate in the production process or a low service life for optical fiber bundles in use. To protect the optical fibers 21 in the transition region 14, additional adhesives 22 were introduced with the aid of syringes with thin needles. To ensure sufficient distribution of the adhesives, they were introduced dropwise from a plurality of locations in the transition region 14 of the fiber bundle.

The adhesives SYLGARD® 184 (hardness: Shore A50) produced by Dow Corning and ECCOBOND® UV 9501 (hardness: Shore D43) produced by Emerson & Cuming have proven particularly suitable for protecting the transition region 14. Neither of these adhesives transmits excessively high stresses to the sensitive optical fibers 21 during mechanical load either through their thermal expansion or through an excessively high strength. Also, they are both equally 30 able to withstand climatic tests. SYLGARD® is based on silicone and ECCOBOND® is based on acrylate.

ECCOBOND® UV 9501 can be cured using LW light within 3 to 8 seconds and is therefore distinguished by particularly simple processing. SYLGARD® 184 is thermally curable, e.g. by heating to 100° C. for one hour, and is therefore more complex to handle.

Comparative bending tests under the same conditions as those described above, applied to fiber bundles with the transition regions protected in this way, showed that there were no longer any broken fibers.

What is claimed is:

1. Process for producing a leached fiber bundle, comprising:

arranging a number of fiber preforms into an ordered fiber bundle preform, heating and drawing out the fiber bundle preform, with interstices being produced between individual fibers (2) and spacers (1), introducing at least one adhesive into the interstices (3) in the drawn-out fiber bundle with the aid of a pressure reduction, sheathing at least one end of the drawn-out fiber bundle with an etch-resistant protective layer, flexibilizing the fiber bundle by removing spacer material in the unsheathed regions, forming at least one rigid end region (11, 20) and at least one flexible region (13).

2. Process according to claim 1, wherein the pressure reduction is generated by pumps.

3. Process according to claim 1, wherein the pressure reduction is produced by cooling preheated gas volumes in the interstices in the drawn-out fiber bundle.

4. Process according to claim 1, wherein the at least one adhesive is introduced into the interstices (3) in two rigid end regions (11; 20) of the fiber bundle, to a filling height (h) of at least 0.5 cm.

5. Process according to claim 4, wherein the at least one adhesive is introduced into the interstices (3) in the two rigid end regions (11, 20) of the fiber bundle to the filling height (h) of 0.5 cm to 5 cm.

6. Process according to claim 4, wherein the at least one adhesive is introduced into the interstices (3) in the two rigid end regions (11, 20) of the fiber bundle to the filling height (h) of 1.5 cm to 2.5 cm.

7. Process according to claim 1, wherein the interstices (3) in two rigid end regions (11, 20) of the fiber bundle are completely filled by the at least one adhesive.

8. Process according to claim 1, wherein the at least one adhesive is cured thermally and/or by irradiation with light.

9. Process according to claim 8, wherein the at least one adhesive is cured using UV irradiation.

10. Process according to claim 1, wherein the at least one adhesive has a viscosity of $5 \cdot 10^{-2}$ Pa·s to 5 Pa·s at 25° C.

11. Process according to claim 1, wherein the at least one adhesive is resistant to hot etching acids and/or hot etching lyes and/or deionized water.

12. Process according to claim 1, wherein the at least one adhesive is based on epoxy and/or acrylate.

13. Process according to claim 1, wherein the at least one adhesive has at most a slight polishability.

14. Process according to claim 1, wherein the at least one adhesive contains nanoparticles.

15. Process according to claim 1, wherein the spaces between the optical fibers (21) in the transition regions (14) between the rigid end regions (11, 20) and the flexible regions (13) are filled with at least one additional adhesive (22) after the flexibilizing operation.

16. Process according to claim 15, wherein the at least one additional adhesive (22) is soft enough in the cured state to keep stresses away from the optical fibers (21) under mechanical load and in the cured state is hard enough not to be cut up by the optical fibers (21).

17. Process according to claim 15, wherein the at least one additional adhesive (22) is introduced with the aid of syringes with thin needles.

18. Process according to claim 15, wherein the at least one additional adhesive (22) is based on silicone and/or acrylate.

19. Process according to claim 1, wherein at least one end of the drawn-out fiber bundle is provided with a sleeve (10).

* * * * *

UNITED STATES PATENT AND TRADEMARK OFFICE

CERTIFICATE OF CORRECTION

PATENT NO. : 6,996,315 B2
APPLICATION NO. : 10/654237
DATED : February 7, 2006
INVENTOR(S) : Henze et al.

It is certified that error appears in the above-identified patent and that said Letters Patent is hereby corrected as shown below:

Column 8, line 38, replace the words "using LW" with -- "using UV" --.

Signed and Sealed this

Thirteenth Day of February, 2007

JON W. DUDAS
*Director of the United States Patent and Trademark Office*